Patented Sept. 29, 1942

2,297,503

UNITED STATES PATENT OFFICE 2,297,503

PROCESS OF DETOXICATING CASTOR POMACE

Willi Rudolph, Karlsruhe, Baden, Germany; vested in the Alien Property Custodian No Drawing. Application July 19, 1941, Serial No. 403,243. In Germany March 18, 1940

3 Claims. (Cl. 99—2)

This invention relates to a process of treating castor pomace and, in particular, to a process of preparing castor pomace for animal and/or human consumption.

The albuminous residue or pomace obtained at the extraction of oil from castor beans contains ricin and ricinine, which substances are poisonous and, therefore, prevent the use of untreated castor pomace as a foodstuff.

It has heretofore been proposed to render the ricin in the castor pomace harmless by boiling and/or steaming the castor pomace. However, this method fails to remove the ricinine which remains in the pomace and, as a result thereof, castor pomace treated in the above mentioned manner and fed to animals has had a harmful effect by causing loss of appetite, constipation and emaciation. I have found that it is the ricinine which, in thus treated castor pomace, causes the said harmful effects.

It has also been suggested to treat castor pomace with a diluted alkaline liquor at a low temperature. While, by this method, it has been possible to obtain a practically non-poisonous foodstuff, the castor pomace treated in this known manner is relatively poor in albumen, the contents of the thus treated castor pomace in albumen amounting to approximately 12% to 15%, whereas the albumen in untreated castor pumace amounts to about 35%.

Accordingly, it is an object of the invention to provide a simple and economical process of rendering the albumen residue or pomace, obtained at the extraction of oil from castor beans, nontoxic without the necessity of applying alkaline liquor which harmfully affects the food value of the treated residue.

It is a further object of the invention to provide a simple method of treating castor pomace which will make it possible not only to render the ricin harmless, but also to extract the ricinine, while substantially all the albumen originally present in the untreated castor pomace will be retained in the treated pomace.

One solution of the problem underlying the present invention has been disclosed in my copending application Serial No. 315,039, filed January 22, 1940, and according to which the pomace to be treated is ground to a fine dust-like powder, which is then boiled in an excess of fresh water for a short time to render the ricin harmless, whereupon the ricinine is extracted by instantaneously separating the liquid in the pomace from the remainder thereof. The withdrawn liquid is discarded and the treatment repeated at least a second time, whereupon the thus treated powder is washed out with hot water and dried.

The method according to the present invention, as will presently appear, constitutes a simplification over the method referred to in the preceding paragraph. It has been found, according to the present invention, that organic solvents such as ethyl alcohol, methyl alcohol, chloroform, acetone, etc., may also be used for extracting the ricinine. Since these solvents have a lower boiling temperature than water, the operating temperature during the extracting operation is reduced. Like the hot water method, the treatment does not involve any loss in albumen, while the heating to more than 80° centigrade requires for destroying the ricin can be performed more simply in a dry state than by boiling with water and may take place before or after extraction, though it is preferably carried out in connection with the drying step for removing the solvent residue.

The following mode of procedure which yields satisfactory results is given by way of example:

*Example*

10 kg. castor pomace are ground in a ball mill to a dust-like powder, which is kept slightly boiling at the reflux with 50 kg. chloroform for about 10 minutes. The solvent is then withdrawn in hot condition, and the well dried residue is treated again with 50 kg. fresh chloroform for 10 minutes, which is then withdrawn in hot condition. The pomace is thereupon again subjected to heat treatment with 50 kg. fresh chloroform for another 10 minutes and is subsequently instantaneously withdrawn and washed with another 50 kg. fresh chloroform. To remove the solvent residue, the pomace is dried and simultaneously heated to over 80° centigrade, whereby also the ricin is inactivated.

I claim:

1. A process of detoxicating castor pomace, which includes the steps of grinding the pomace to be treated to a powder, repeatedly boiling the pomace with an organic solvent sucked off and renewed prior to each boiling step, washing the pomace with fresh solvent, drying the pomace to remove residual solvent and simultaneously heating it to inactivate and destroy the poisonous substances contained therein.

2. A process of detoxicating castor pomace, which includes the steps of (*a*) grinding the pomace to be treated to a dust-like powder, (*b*) boiling said powder with a fresh organic solvent for a short time, (*c*) extracting the ricinine by withdrawing the solvent in hot condition from the thus obtained mixture, (*d*) discarding the withdrawn solvent, (*e*) repeating the steps (*b*), (*c*) and (*d*) at least a second time, (*f*) washing the thus treated powder with a fresh solvent, and (*g*) drying the thus obtained powder to remove the residual solvent while simultaneously heating the said powder to inactivate and destroy the ricin.

3. A process of detoxicating castor pomace, which includes the steps of (*a*) grinding the pomace to be treated to a dust-like powder, (*b*) boiling said powder with a fresh organic solvent for a short time, (*c*) extracting the ricinine by withdrawing the solvent in hot condition from the thus obtained mixture, (*d*) discarding the withdrawn solvent, (*e*) repeating the steps (*b*), (*c*) and (*d*) at least a second time, (*f*) washing the thus treated powder with a fresh solvent, and (*g*) drying the thus obtained powder to remove the residual solvent while simultaneously heating the said powder to a temperature in excess of 80° centigrade to inactivate and destroy the ricin.

WILLI RUDOLPH.